United States Patent
Kim et al.

(10) Patent No.: US 11,747,986 B2
(45) Date of Patent: Sep. 5, 2023

(54) CONTAINER-BASED CLOUD SERVICE PROVIDING SYSTEM AND METHOD THEREFOR

(71) Applicant: KBSYS INC., Seoul (KR)

(72) Inventors: Kee Baek Kim, Seoul (KR); Soo Hyun Cho, Suwon-si (KR); Yong Hyuk Lee, Namyangju-si (KR); Young Jin Yang, Siheung-si (KR); Seung In Bae, Seoul (KR); Jin Hee Song, Suwon-si (KR)

(73) Assignee: KBSYS INC., Seoul (KR)

( * ) Notice: Subject to any disclaimer, the term of this patent is extended or adjusted under 35 U.S.C. 154(b) by 0 days.

(21) Appl. No.: 17/786,281

(22) PCT Filed: Sep. 5, 2020

(86) PCT No.: PCT/KR2020/012001
§ 371 (c)(1),
(2) Date: Jun. 16, 2022

(87) PCT Pub. No.: WO2021/125502
PCT Pub. Date: Jun. 24, 2021

(65) Prior Publication Data
US 2023/0015876 A1    Jan. 19, 2023

(30) Foreign Application Priority Data

Dec. 16, 2019    (KR) .................. 10-2019-0168264

(51) Int. Cl.
*G06F 3/06*    (2006.01)
(52) U.S. Cl.
CPC ............ *G06F 3/0611* (2013.01); *G06F 3/067* (2013.01); *G06F 3/0653* (2013.01)

(58) Field of Classification Search
CPC ....... G06F 3/0611; G06F 3/0653; G06F 3/067
See application file for complete search history.

(56) References Cited

U.S. PATENT DOCUMENTS

| | | | |
|---|---|---|---|
| 2018/0121221 A1* | 5/2018 | Ahuja | H04L 63/02 |
| 2019/0342305 A1* | 11/2019 | Sunkaranam | H04L 63/145 |

FOREIGN PATENT DOCUMENTS

| | | |
|---|---|---|
| JP | 6052406 B2 | 12/2016 |
| JP | 6286504 B2 | 2/2018 |

(Continued)

OTHER PUBLICATIONS

Watfa, Mohamed, Hiba Halabi, and Marwa El-Ghali. "A scalable security protocol for wireless sensor networks." (2008). (Year: 2008).*

*Primary Examiner* — Nicholas J Simonetti
(74) *Attorney, Agent, or Firm* — NKL LAW; Jae Youn Kim

(57) ABSTRACT

A container-based cloud service providing system of the present disclosure includes an access server network-connected to a plurality of user terminals through a web socket; an in-memory cluster having an area allocated in a cloud and storing an authentication key and event data based on a container; a server module providing a cloud service to the user terminal; a manager module managing the server module; and a database. The server module includes a security module having a container structure and performing authentication of the user terminal; a data storage module having a container structure and periodically storing the event data stored in the in-memory cluster in the database; and a service module providing the cloud service by using the event data.

4 Claims, 8 Drawing Sheets

(56) References Cited

FOREIGN PATENT DOCUMENTS

| | | |
|---|---|---|
| JP | 2019-536329 A | 12/2019 |
| KR | 10-2018-0036093 A | 4/2018 |
| KR | 10-2019-0020843 A | 3/2019 |
| KR | 10-2090911 B1 | 3/2020 |

\* cited by examiner

US 11,747,986 B2

CONTAINER-BASED CLOUD SERVICE PROVIDING SYSTEM AND METHOD THEREFOR

TECHNICAL FIELD

The present disclosure relates to a system and method for providing a container-based cloud service and, more particularly, to a container-based cloud service providing system and method for enabling simultaneous access by large-scale users without performance degradation.

BACKGROUND ART

A cloud service has advantages of reducing the user's IT cost and improving the agility and efficiency of resource operation. Because of these advantages, a variety of cloud services are being used, and the integration of such clouds is also becoming an issue.

For example, a hybrid cloud service that absorbs advantages of both a public cloud and a private cloud or links heterogeneous clouds based on a public cloud is being introduced.

However, due to limited resources, this cloud service may cause a problem such as performance delay or system delay whenever the number of users increases.

DISCLOSURE

Technical Problem

The present disclosure is intended to provide a container-based cloud service providing system and method that do not cause problems such as performance degradation even in case of simultaneous access by a large number of users.

Technical Solution

According to an embodiment of the present disclosure, a container-based cloud service providing system may include an access server network-connected to a plurality of user terminals through a web socket, an in-memory cluster having an area allocated in a cloud and storing an authentication key and event data based on a container, a server module providing a cloud service to the user terminal, a manager module managing the server module, and a database. The server module may include a security module having a container structure and performing authentication of the user terminal, a data storage module having a container structure and periodically storing the event data stored in the in-memory cluster in the database, and a service module providing the cloud service by, using the event data. The security module generates the authentication key for each user terminal, stores the authentication key in the in-memory cluster, and periodically performs authentication of the user terminal by using the authentication key stored in the in-memory cluster while the user terminal uses the cloud service, and the manager module performs scaling of the security module for load balancing of the security module.

In addition, the in-memory cluster may include a slave node having a container structure and storing the authentication key and the event data in a cache, a master node having a container structure and monitoring a state of the slave node, and a manager node having a container structure and storing information of the in-memory cluster.

In addition, the master node may transmit a notification to a manager terminal when a utilization amount of secured resources reaches a threshold, and the manager node may further generate the slave node in response to a request transmitted from the manager terminal.

In addition, the manager module may adjust the number of the security module in response to traffic by the user terminal.

In addition, the manager module may adjust the number of at least one of the data storage module and the service module in response to the traffic by the user terminal.

According to an embodiment of the present disclosure, a container-based cloud service providing system may include a public cloud, a private cloud, an in-memory cluster having an area allocated in the public cloud and storing an authentication key and event data based on a container, a database included in the private cloud, an access server network-connected to a plurality of user terminals through a web socket and relaying a connection between the in-memory cluster and the database, a first server module included in the public cloud and providing a public cloud service to the user terminal, a second server module included in the private cloud and providing a private cloud service to the user terminal, and a manager module managing the first server module and the second server module. The first server module may include a first security module having a container structure and performing authentication of the user terminal, a first data storage module having a container structure and periodically storing event data related to the public cloud service and stored in the in-memory cluster in the database, and a first service module providing the public cloud service by using the event data related to the public cloud service. The second server module may include a second security module having a container structure and performing authentication of the user terminal, a second data storage module having a container structure and periodically storing event data related to the private cloud service and stored in the in-memory cluster in the database, and a second service module providing the private cloud service by using the event data related to the private cloud service. The first security module generates the authentication key for each user terminal intending to use the public cloud service, stores the authentication key in the in-memory cluster, and periodically performs authentication of the user terminal by using the authentication key stored in the in-memory cluster while the user terminal uses the public cloud service. The second security module generates the authentication key for each user terminal intending to use the private cloud service, stores the authentication key in the in-memory cluster, and periodically performs authentication of the user terminal by using the authentication key, stored in the in-memory cluster while the user terminal uses the private cloud service. The manager module performs scaling of the first and second security modules for load balancing of the first and second security modules.

According to an embodiment of the present disclosure, a container-based cloud service providing method may include network-connecting an access server and a plurality of user terminals through a web socket, generating an authentication key for each of the user terminals and storing the authentication key in a container-based in-memory cluster having an area allocated in a cloud, by a security module having a container structure, periodically performing authentication of the user terminal by using the authentication key stored in the in-memory cluster while the user terminal uses a cloud service, through a service module having a container structure, providing the cloud service to the authenticated user terminal and storing event data generated upon providing the cloud service in the in-memory cluster, through a data storage module having a container structure, periodically storing the event data stored in the in-memory cluster in a database, and by a manager module, performing scaling of the security module for load balancing of the security module.

In addition, the in-memory cluster may include a slave node having a container structure and storing the authentication key and the event data in a cache memory, a master node having a container structure and monitoring a state of the slave node, and a manager node having a container structure and storing information of the in-memory cluster.

In addition, the master node may further generate the slave node when a utilization amount of secured resources reaches a threshold.

In addition, performing scaling of the security module may include adjusting the number of the security module in response to traffic by the user terminal.

In addition, the method may further include adjusting the number of at least one of the data storage module and the service module in response to the traffic by the user terminal.

Advantageous Effects

According to the present disclosure, it is possible to provide a container-based cloud service providing system and method that do not cause problems such as performance degradation even in case of simultaneous access by a large number of users.

BEST MODE

Figure 1:
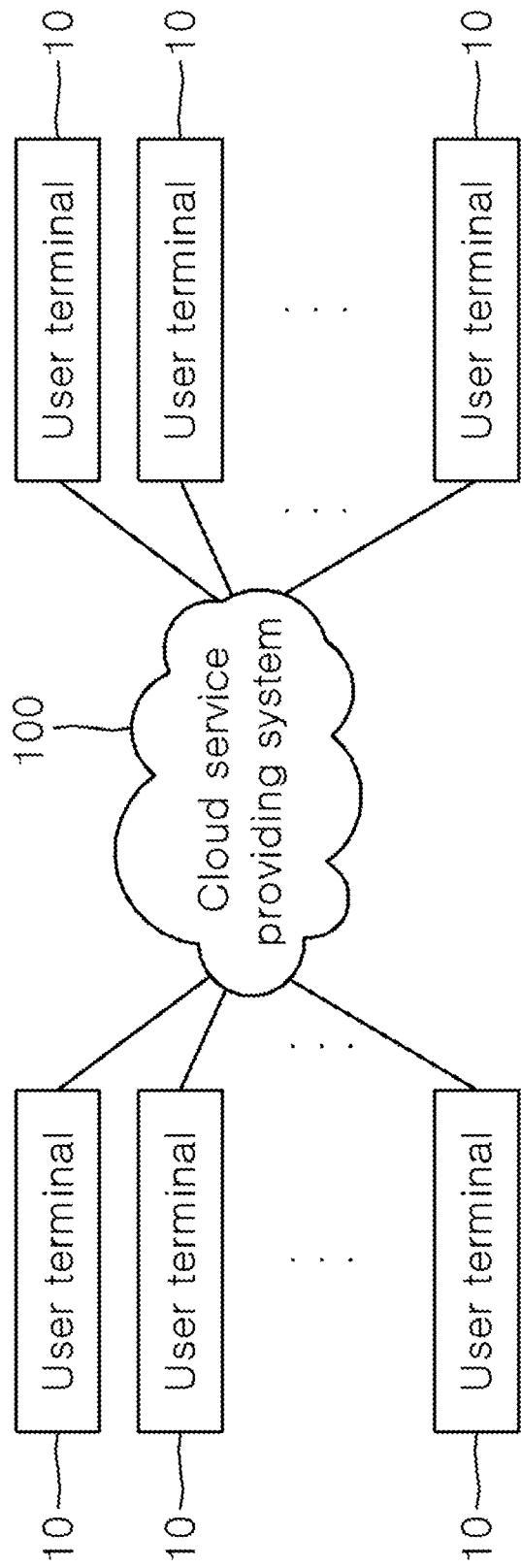
FIG. 1 is a diagram illustrating a connection relationship between a user terminal and a container-based cloud service providing system according to an embodiment of the present disclosure.

Hereinafter, embodiments related to this disclosure, which are illustrated in the drawings, will be described specifically through detailed description. However, this disclosure is not limited to the embodiments disclosed below, but may be implemented in various different forms. It should be understood that this disclosure includes all modifications, equivalents, and substitutes included in the spirit and scope of this disclosure.

Terms, such as first, second, A, B, (a), and (b), may be used to describe various configuration elements. These terms are used only for the purpose of distinguishing one configuration element from another configuration element, and do not limit the essence, sequence, or order of the corresponding configuration elements. Additionally, when one configuration element is described herein as being "connected", "coupled" or "contacted" to another configuration element, the one configuration element may be directly connected to, coupled to, or contacted to the other configuration element, and, however, it should be understood that still another configuration element may be "connected", "coupled" or "contacted" therebetween. In the case of being "connected", "coupled" or "contacted", it may be understood as being physically "connected", "coupled" or "contacted" as well as being electrically "connected", "coupled" or "contacted" as needed.

The term, such as "~part (unit)", "~group", "~element", "~module", or the like, described in this specification refers to a unit for processing at least one function or operation, which may be embodied by hardware, software, or a combination of hardware and software. Additionally, in the present specification, the term, such as "include", "comprise", "have", or the like, is intended to designate existence of a corresponding configuration element, and thus should be construed as having the possibility of existence or addition of other configuration element without excluding it, unless expressly stated to the contrary.

And it should be noted that the classification of the configuration parts in the present specification is merely a division according to a main function which each configuration part is responsible for. That is, two or more configuration parts to be described below may be combined into one configuration part, or one configuration part may be divided into two or more configuration parts according to more subdivided functions. And each of the configuration parts to be described below may additionally perform some or all of the functions of other configuration elements in addition to the main function which it is responsible for, and of course, some of the main functions that each of the configuration parts is responsible for may be exclusively performed by another configuration part.

Hereinafter, a container-based cloud service providing system and method according to an embodiment of the present disclosure will be described with reference to the accompanying drawings related to embodiments of this disclosure.

FIG. 1 is a diagram illustrating a connection relationship between a user terminal and a container-based cloud service providing system according to an embodiment of the present disclosure.

Referring to FIG. 1, a container-based cloud service providing system 100 according to an embodiment of the present disclosure may be connected to a plurality of user terminals 10 via network, thereby providing various cloud services to users.

Here, the network refers to a connection structure in which information exchange is possible between respective nodes such as a terminal and a server. The network may include, for example, but is not limited to, the Internet, a local area network (LAN), a wireless LAN, a wide area network (WAN), a personal area network (PAN), 3G, 4G, 5G, LTE, Wi-Fi, or the like.

Recently, for data generated in various fields, a cloud computing environment has been introduced due to the size and type of data. In particular, most software is distributed in the form of a service based on the cloud environment.

In addition, services such as an interactive messenger, a portal, and a knowledge blog are also provided based on the cloud environment.

The user terminal 10 is accessible to the container-based cloud service providing system 100 through the network, and the user can use various cloud services provided by the container-based cloud service providing system 100.

The user terminal 10 is not particularly limited as long as it is a device having a communication function for connection to the container-based cloud service providing system 100 and a display function capable of outputting an image or text. For example, the user terminal 10 may include, but is not limited to, a desktop computer, a laptop computer, a tablet PC, a wireless phone, a mobile phone, a smart phone, a smart watch, a smart glass, a wearable device, and the like.

Figure 2A:
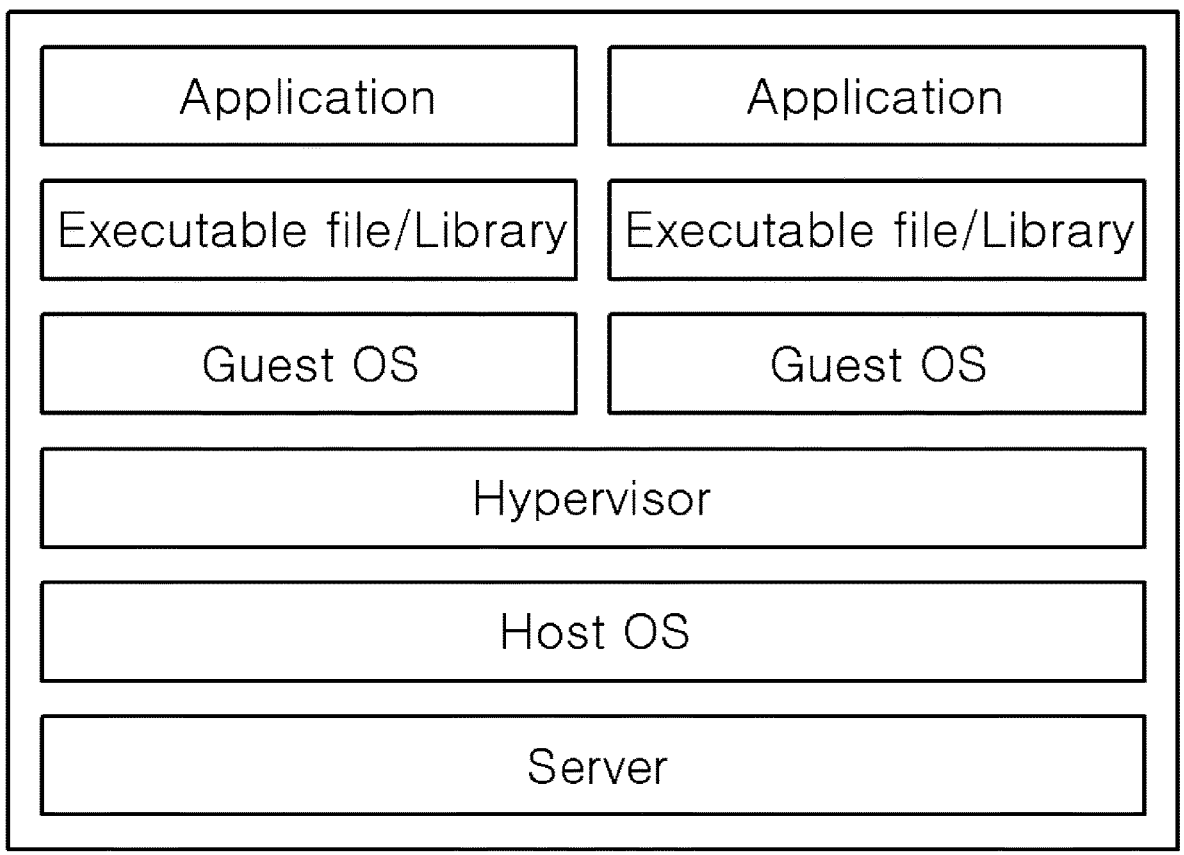
FIG. 2A is a hierarchy diagram of an existing virtual machine.
Figure 2B:
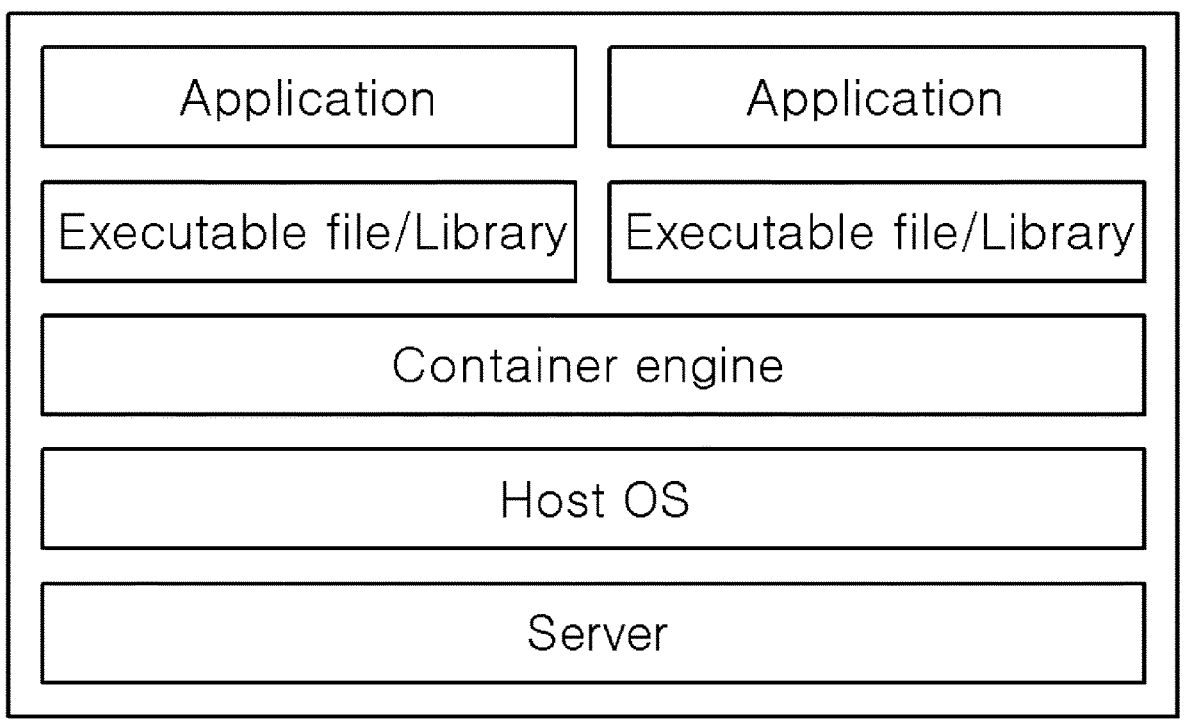
FIG. 2B is a hierarchy diagram of a container according to an embodiment of the present disclosure.

FIG. 2A is a hierarchy diagram of an existing virtual machine, and FIG. 2B is a hierarchy diagram of a container according to an embodiment of the present disclosure.

Server virtualization technology, which is the existing traditional scheme of configuring a cloud, has been implemented through the creation of the virtual machine through a hypervisor. Referring to FIG. 2A, because the virtual machine is a type of computer, it is always necessary to install a guest OS above a host OS and the hypervisor. Therefore, because the OS is included in an image, there is a disadvantage in that the image capacity is increased, and also there is a problem in that a lot of traffic is induced in order to transmit a virtualized image through the Internet. In particular, because the virtual machine focuses merely on virtualizing the OS, it has only a function of creating and executing an image, but lacks functions of deployment and management.

In contrast, as shown in FIG. 2B, the container has a relatively simple hierarchical structure compared to the virtual machine. In this container, only a container engine exists above the host OS, and the guest OS does not exist separately. Therefore, only programs and libraries for server operation can be isolated and installed in the image installed in the container, and the image capacity can be greatly reduced by sharing OS resources with the host OS. In addition, unlike the virtual machine, the container does not have a separate layer to virtualize hardware, so it can have an advantage in that memory access, file system, and network speeds are relatively faster than those of the virtual machine.

Figure 3:
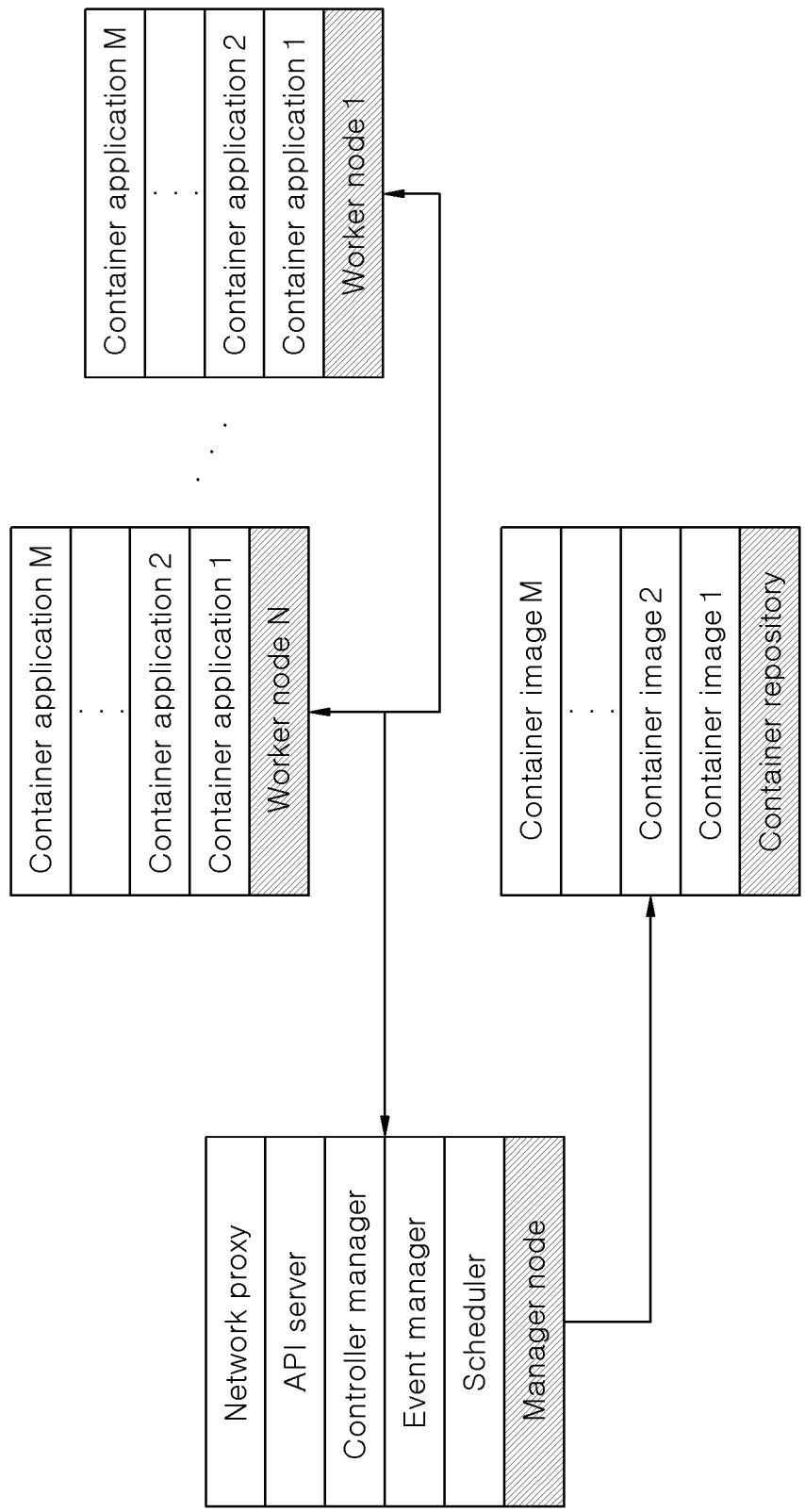
FIG. 3 is a diagram illustrating an architecture of a container-based cloud service providing system according to an embodiment of the present disclosure.

FIG. 3 is a diagram illustrating an architecture of a container-based cloud service providing system according to an embodiment of the present disclosure.

The container-based cloud service providing system 100, which is a system supporting various server environments and web-based applications, has an architectural environment as shown in FIG. 3.

That is, the container-based cloud service providing system 100 includes worker nodes that are virtual or physical machines to which the container is deployed, a management node (or a master node) that manages all the worker nodes, and a container repository in which container images are stored.

In addition, each worker node includes one or more container applications, and the containers belonging to the same worker node are capable of communicating with each other locally and sharing disk resources.

The management node is capable of storing a cloud system setting environment and performing management for the entire cluster composed of worker nodes. To this end, the management node may include a network proxy, an API server, a controller manager, an event manager, and a scheduler.

The network proxy receives and relays a request from a client looking for resources on other servers in a computer network, thereby simplifying and encapsulating the structure of a distributed system to reduce the complexity of a service.

The API server is responsible for a request from a user or communication between nodes. The scheduler allocates resources required for container (or pod) deployment and service to appropriate nodes.

In addition, the controller manager manages adjusting a storage space of a container (or pod), allocating or duplicating a label for a dynamically added or deleted container (or pod), or load balancing in a grouping service of multiple containers (pods). When a specific situation (or event) occurs in the cloud system, the event manager notifies it to a manager terminal.

The worker node is a service component that receives a command from the management node and performs an actual work, and may have at least one or more container applications.

Figure 4:
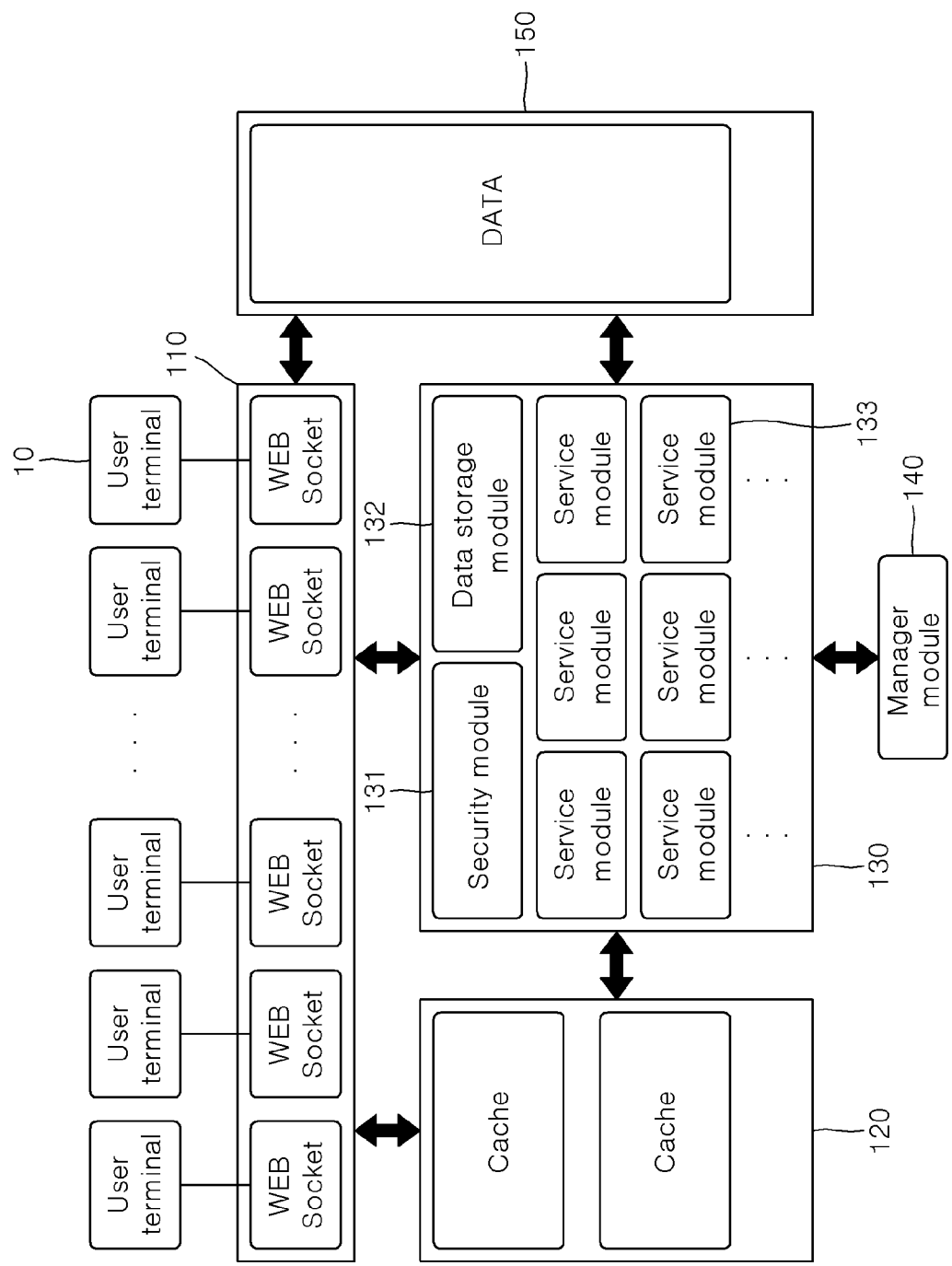
FIG. 4 is a diagram illustrating a container-based cloud service providing system according to an embodiment of the present disclosure.

FIG. 4 is a diagram illustrating a container-based cloud service providing system according to an embodiment of the present disclosure.

Referring to FIG. 4, the container-based cloud service providing system 100 may include an access server 110, an in-memory cluster 120, a server module 130, a manager module 140, and a database 150.

The access server 110 may be network-connected to a plurality of user terminals 10 through a web socket. Although not shown, the user terminal 10 may access the access server 110 through an L7 switch.

The web socket is a communication protocol that enables full-duplex communication between a web browser and a web server. After the server and the client are connected once, all necessary communication can be performed on that connection based on the web socket dedicated protocol. Advantages are that an access time can be maintained for a long time, a communication loss is small because of using a lightweight protocol unlike HTTP, and the influence of other applications connected to the same server is small because all data transmission and reception are possible through one connection.

The in-memory cluster 120 may store an authentication key and event data, based on the container. The in-memory cluster 120 has an area allocated in the cloud and may be formed based on volatile memory resources such as cache and RAM memory.

That is, the in-memory cluster 120 provides the cache in which the authentication key and event data are stored, and this makes it possible to provide a more comfortable and faster cloud service to a user.

The authentication key is used for authentication of a user who intends to use the container-based cloud service providing system 100, and the event data refer to a set of data required for providing the cloud service and data generated upon providing the cloud service.

The server module 130 is capable of providing the cloud service to the user terminal 10 that accesses the access server 110. The server module 130 may perform a user authentication operation and an operation of storing the event data of the in-memory cluster 120 in the database 150, and also provide various cloud services through a plurality of subdivided service modules 133.

The server module 130 may be constructed based on a plurality of server resources, and may include a container-structured security module 131, a container-structured data storage module 132, and container-structured service modules 133.

The security module 131 has a container structure as shown in FIG. 2B, and may perform user login and authentication procedures. For example, the security module 131 may provide a login interface to the user terminal 10 accessing the access server 110, and perform periodic authentication for the user terminal 10 on which the login procedure is completed.

For example, the security module 131 may generate and grant different authentication keys to the respective user terminals 10 for which the login procedure is completed, and may store the authentication keys for such user terminals 10 in the in-memory cluster 120.

In addition, while the user terminal 10 uses the cloud service provided by the server module 130, the security module 131 may perform periodically (e.g., every 5 seconds) the authentication of the user terminal 10 by using the authentication key stored in the in-memory cluster 120.

For example, the authentication key granted by the security module 131 may also be stored in the user terminal 10, and the security module 131 may perform the authentication procedure by periodically receiving the authentication key from the user terminal 10 and comparing it with the authentication key stored in the in-memory cluster 120. That is, if the authentication key received from the user terminal 10 is identical with the authentication key stored in the in-memory cluster 120, the security module 131 determines the authentication to be successful and continuously permits the user to use the cloud service. If the received authentication key is different from the authentication key stored in the in-memory cluster 120, the security module 131 determines authentication to be failed and may block the user's use of the cloud service.

When the access of the user terminal 10 is terminated, the security module 131 may delete the authentication key of the user terminal 10 stored in the in-memory cluster 120. Upon reaccess of the user terminal 10 later, the above-described login and authentication procedures may be performed again.

Because of performing the authentication procedure based on the authentication key stored in the in-memory cluster 120, the security module 131 can perform the authentication operation having an improved speed compared to the existing one.

The data storage module 132 has a container structure as shown in FIG. 2B and may periodically store the event data, stored in the in-memory cluster 120, in the database 150.

The service module 133 has a container structure as shown in FIG. 2B, and may provide a cloud service corresponding to a loaded application to the user terminal 10.

At this time, the service module 133 provides the cloud service by using the event data stored in the in-memory cluster 120, and thus it is possible to provide the service having improved speed and responsiveness.

For example, in case that the container-based cloud service providing system 100 provides an interactive messenger service, the service modules 133 such as a group message module, a message delay processing module, an external mobile notification message module, and a PC message module may be installed.

The manager module 140 performs a management operation of the server module 130 and may perform, if necessary, a scaling operation on the modules 131, 132, and 133 included in the server module 130.

Scaling is for balancing loads generated by multiple user accesses, etc., and refers to a function of adjusting the number of corresponding modules 131, 132, and 133 in response to the generated loads. For example, it is possible to increase or decrease the number of corresponding modules 131, 132, and 133 in response to the number of sessions of the user terminal 10 and/or traffic generated by the user terminals 10.

For example, the manager module 140 may adjust the number of corresponding modules 131, 132, and 133 according to the following equation.

$$Nm = a*Ns + b*Nt$$

where Nm is the number of modules, Ns is the number of sessions of the user terminals 10 accessing the access server 110, Nt is the traffic generated by the user terminals 10 accessing the access server 110, 'a' is a first adjustment constant, and 'b' is a second adjustment constant.

When determining the number of module 131, 132, and 133, the first adjustment constant 'a' and the second adjustment constant 'b' may be set differently.

For example, because the security module 131 is highly influenced by the number of sessions of the user terminal 10, the manager module 140 may calculate the number of security modules 131 through an equation in which the first adjustment constant 'a' is set greater than the second adjustment constant 'b' when the security module 131 is scaled.

In addition, because the data storage module 132 is equally influenced by the number of sessions of the user terminal 10 and the traffic generated by the user terminal 10, the manager module 140 may calculate the number of data storage modules 132 through an equation in which the first adjustment constant 'a' and the second adjustment constant 'b' are set to be equal when the data storage module 132 is scaled.

Because the service module 133 is highly influenced by the traffic generated by the user terminal 10, the manager module 140 may calculate the number of service modules 133 through an equation in which the first adjustment constant 'a' is set to be smaller than the second adjustment constant 'b' when the service module 133 is scaled.

Meanwhile, because the modules 131, 132, and 133 included in the server module 130 each have a container structure, duplication and management of these modules 131, 132, and 133 having the container structure are easy.

For example, the manager module 140 may perform scaling of the security module 131 for load balancing of the security module 131. Specifically, the manager module 140 may adjust the number of security modules 131 in response to the traffic generated by the user terminal 10.

That is, when a large number of user terminals 10 additionally access the container-based cloud service providing system 100, the load of the security module 131 may rapidly increase, thereby causing the authentication procedure and service use to be delayed.

In order to solve this problem, the manager module 140 may detect traffic by the user terminal 10, increase the number of security modules 131 when the detected traffic exceeds a predetermined reference value, and determine the increase number of the security module 131 in response to the amount of traffic exceeding the reference value.

Similarly, the amount of event data stored in the in-memory cluster 120 may increase as the number of users increases, and in this case, the loads of the data storage module 132 and the service module 133 may also increase.

Therefore, in order to balance the loads of the data storage module 132 and the service module 133, the manager module 140 may perform scaling of the data storage module 132 and/or the service module 133 in the same manner as in the security module 131.

For example, the manager module 140 may adjust the number of at least one of the data storage module 132 and the service module 133 in response to the traffic by the user terminal 10.

The database 150 may be formed based on resources such as non-volatile memory. Data stored in the in-memory cluster 120 may be periodically stored in the database 150.

Figure 5:
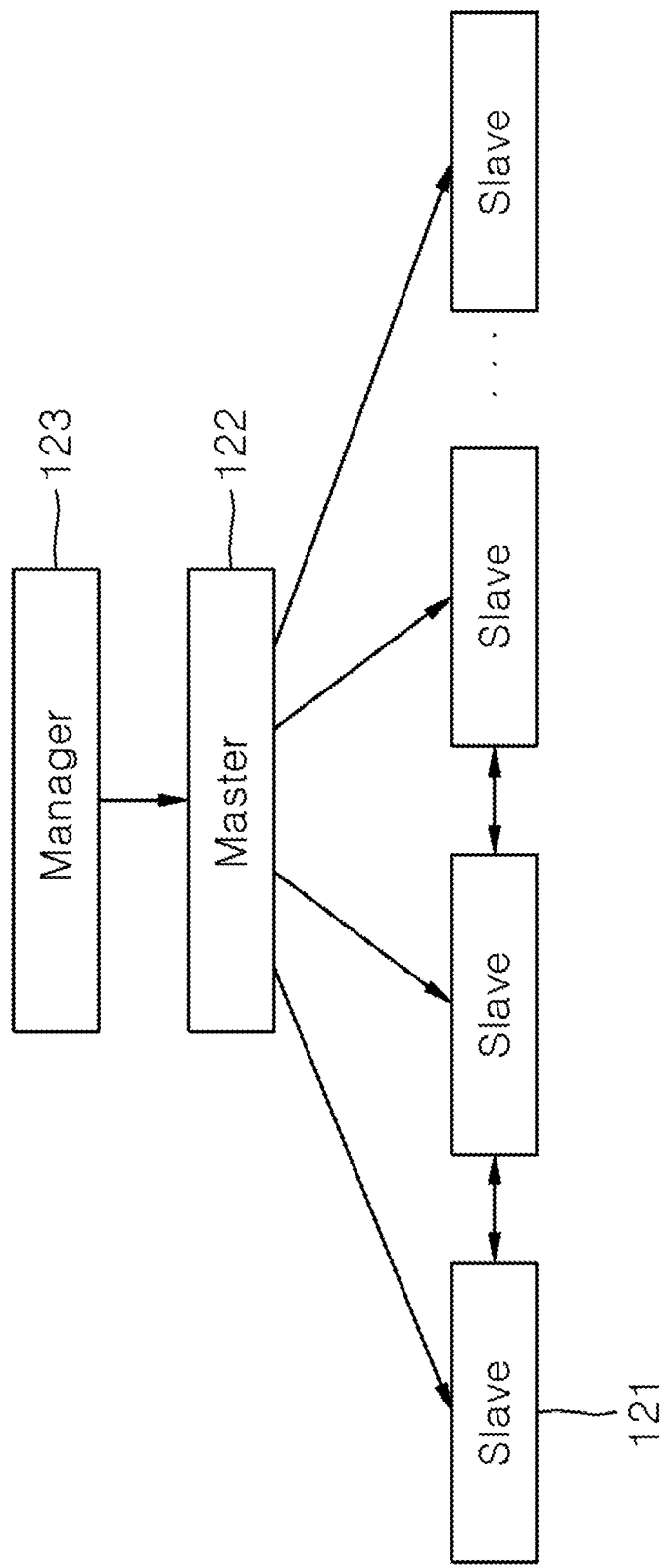
FIG. 5 is a diagram illustrating an in-memory cluster according to an embodiment of the present disclosure.

FIG. 5 is a diagram illustrating an in-memory cluster according to an embodiment of the present disclosure.

Referring to FIG. 5, the in-memory cluster 120 according to an embodiment of the present disclosure may include a slave node 121, a master node 122, and a manager node 123 each having the container structure of FIG. 2B.

The slave node 121 may store the authentication key and event data in a cache. To this end, a cache capable of storing data may be allocated to each slave node 121.

The master node 122 monitors the state of the slave node 121. For example, the master node 122 may provide a notification to a manager terminal (not shown) when the utilization amount of resources secured through the slave node 121 reaches a predetermined threshold.

In response, the manager may transmit a slave addition request through the manager terminal, and the manager node 123 may additionally secure necessary resources by adding the slave node 121 in response to the request.

By designing the in-memory cluster 120 based on the container as described above, it is possible to prevent an unexpected load from occurring in the in-memory cluster 120 due to simultaneous access of a large number of users and thereby prevent any system failure. That is, by constructing the in-memory cluster 120 based on the container, it is possible to secure a desired amount of resources by responding to an actual data request in real time. This can provide a cloud service that does not cause problems such as performance degradation even in case of simultaneous access of a large number of users.

Figure 6:
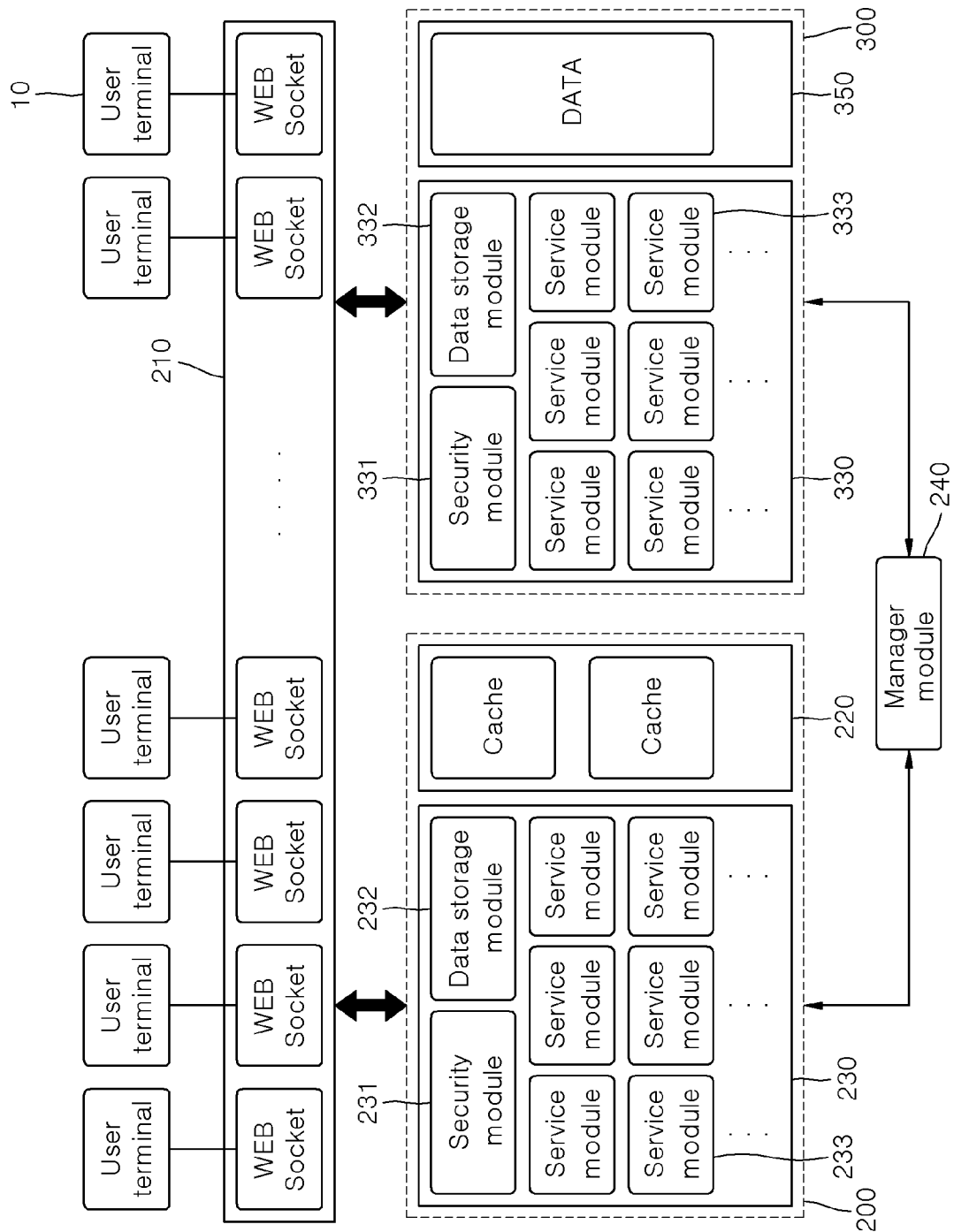
FIG. 6 is a diagram illustrating a container-based cloud service providing system according to another embodiment of the present disclosure.

FIG. 6 is a diagram illustrating a container-based cloud service providing system according to another embodiment of the present disclosure.

Referring to FIG. 6, the container-based cloud service providing system according to another embodiment of the present disclosure is a hybrid cloud including a public cloud 200 and a private cloud 300, and may be configured to further include an access server 210 and a manager module 240.

The access server 210 may be network-connected to a plurality of user terminals 10 through a web socket. Although not shown, the user terminal 10 may access the access server 210 through an L7 switch.

The access server 210 may relay a connection with an in-memory cluster 220 having an allocated area in the public cloud 200. For example, a second server module 330 included in the private cloud 300 may use an authentication key and event data stored in the in-memory cluster 220 through the access server 210.

In addition, the access server 210 may relay a connection with a database 350 included in the private cloud 300. For example, a first server module 230 included in the public cloud 200 may access the database 350 through the access server 210.

The public cloud 200 is configured to include the in-memory cluster 220 and the first server module 230 and may provide a public cloud service to a user.

The in-memory cluster 220 may store an authentication key and event data, based on the container. The in-memory cluster 220 has an area allocated in the public cloud 200 and may be formed based on volatile memory resources such as cache and RAM memory.

The authentication key is used for authentication of a user who wants to use the container-based cloud service providing system, and the event data refer to a set of data required for providing public and private cloud services and data generated upon providing the public and private cloud services.

The first server module 230 is capable of providing the public cloud service to the user terminal 10 that accesses the access server 210. The first server module 230 may perform an operation of user authentication and an operation of storing the event data of the in-memory cluster 220 in the database 350, and also provide various public cloud services through a plurality of subdivided service modules 233.

The first server module 230 may be constructed based on a plurality of server resources, and may include a first container-structured security module 231, a first container-structured data storage module 232, and first container-structured service modules 233.

The first security module 231 has a container structure as shown in FIG. 2B, and may perform login and authentication procedures for a user who wants to use the public cloud service. For example, the first security module 231 may provide a login interface to the user terminals 10 requesting the use of the public cloud service among the user terminals 10 accessing the access server 210, and perform periodic authentication for the user terminal 10 on which the login procedure is completed.

For example, the first security module 231 may generate and grant different authentication keys to the respective user terminals 10 for which the login procedure is completed, and may store the authentication keys for such user terminals 10 in the in-memory cluster 220.

In addition, while the user terminal 10 uses the public cloud service provided by the first server module 230, the first security module 231 may perform periodically (e.g., every 5 seconds) the authentication of the user terminal 10 by using the authentication key stored in the in-memory cluster 220.

For example, the authentication key granted by the first security module 231 may also be stored in the user terminal 10, and the first security module 231 may perform the authentication procedure by periodically receiving the authentication key from the user terminal 10 and comparing it with the authentication key stored in the in-memory cluster 220. That is, if the authentication key received from the user terminal 10 is identical with the authentication key stored in the in-memory cluster 220, the first security module 231 determines the authentication to be successful and continuously permits the user to use the public cloud service. If the received authentication key is different from the authentication key stored in the in-memory cluster 220, the first security module 231 determines authentication to be failed and may block the user's use of the public cloud service.

When the access of the user terminal 10 is terminated, the first security module 231 may delete the authentication key of the user terminal 10 stored in the in-memory cluster 220. Upon reaccess of the user terminal 10 later, the above-described login and authentication procedures may be performed again.

Because of performing the authentication procedure based on the authentication key stored in the in-memory cluster 220, the first security module 231 can perform the authentication operation having an improved speed compared to the existing one.

The first data storage module 232 has a container structure as shown in FIG. 2B and may periodically store the event data, related to the public cloud service and stored in the in-memory cluster 220, in the database 350. In this case, because the database 350 is configured to belong to the private cloud 200 for data security, the first data storage module 232 may store the event data in the database 350 through the access server 210.

The first service module 233 has a container structure as shown in FIG. 2B, and may provide a public cloud service corresponding to a loaded application to the user terminal 10.

At this time, the first service module 233 provides the public cloud service by using the event data stored in the in-memory cluster 220, and thus it is possible to provide the service having improved speed and responsiveness.

The private cloud 300 is configured to include the second server module 330 and the database 350 and may provide a private cloud service to a user.

The second server module 330 is capable of providing the private cloud service to the user terminal 10 that accesses the access server 210. The second server module 330 may perform an operation of user authentication and an operation of storing the event data of the in-memory cluster 220 in the database 350, and also provide various private cloud services through a plurality of subdivided service modules 233.

The second server module 330 may be constructed based on a plurality of server resources, and may include a second container-structured security module 331, a second container-structured data storage module 332, and second container-structured service modules 333.

The second security module 331 has a container structure as shown in FIG. 2B, and may perform login and authentication procedures for a user who wants to use the private cloud service. For example, the second security module 331 may provide a login interface to the user terminals 10 requesting the use of the private cloud service among the user terminals 10 accessing the access server 210, and perform periodic authentication for the user terminal 10 on which the login procedure is completed.

For example, the second security module 331 may generate and grant different authentication keys to the respective user terminals 10 for which the login procedure is completed, and may store the authentication keys for such user terminals 10 in the in-memory cluster 220.

In addition, while the user terminal 10 uses the private cloud service provided by the second server module 330, the second security module 331 may perform periodically (e.g., every 5 seconds) the authentication of the user terminal 10 by using the authentication key stored in the in-memory cluster 220.

For example, the authentication key granted by the second security module 331 may also be stored in the user terminal 10, and the second security module 331 may perform the authentication procedure by periodically receiving the authentication key from the user terminal 10 and comparing it with the authentication key stored in the in-memory cluster 220. That is, if the authentication key received from the user terminal 10 is identical with the authentication key stored in the in-memory cluster 220, the second security module 331 determines the authentication to be successful and continuously permits the user to use the private cloud service. If the received authentication key is different from the authentication key stored in the in-memory cluster 220, the second security module 331 determines authentication to be failed and may block the user's use of the private cloud service.

When the access of the user terminal 10 is terminated, the second security module 331 may delete the authentication key of the user terminal 10 stored in the in-memory cluster 220. Upon reaccess of the user terminal 10 later, the above-described login and authentication procedures may be performed again.

Because of performing the authentication procedure based on the authentication key stored in the in-memory cluster 220, the second security module 331 can perform the authentication operation having an improved speed compared to the existing one.

The second data storage module 332 has a container structure as shown in FIG. 2B and may periodically store the event data, related to the private cloud service and stored in the in-memory cluster 220, in the database 350.

The second service module 333 has a container structure as shown in FIG. 2B, and may provide a private cloud service corresponding to a loaded application to the user terminal 10.

At this time, the second service module 333 provides the private cloud service by using the event data stored in the in-memory cluster 220, and thus it is possible to provide the service having improved speed and responsiveness.

The manager module 240 performs an integrated management operation for the first server module 230 and the second server module 330, and may perform a scaling operation for the modules 231, 232, 233, 331, 332, and 333 included in the respective server modules 230 and 330 as necessary.

Scaling is for balancing loads generated by multiple user accesses, etc., and refers to a function of adjusting the number of corresponding modules 231, 232, 233, 331, 332, and 333 in response to the generated loads. For example, it is possible to increase or decrease the number of corresponding modules 231, 232, 233, 331, 332, and 333 in response to the number of sessions of the user terminal 10 and/or traffic generated by the user terminals 10.

For example, for load balancing of the first security module 231 and/or the second security module 331, the manager module 240 may perform scaling of the security modules 231 and 331. Specifically, the manager module 240 may adjust the number of the first security modules 231 in response to the traffic generated by the user terminal 10 using the public cloud service, and also adjust the number of the second security modules 331 in response to the traffic generated by the user terminal 10 using the private cloud service In addition, in order to balance the loads of the first data storage module 232, the first service module 233, the second data storage module 332, and the second service module 333, the manager module 240 may perform scaling of such modules 232, 233, 332, and 333 in the same manner as in the security modules 231 and 331.

The database 350 may be formed based on resources such as non-volatile memory. Data stored in the in-memory cluster 220 may be periodically stored in the database 350 through the access server 210.

Meanwhile, as described above with reference to FIG. 5, the in-memory cluster 220 may include the slave node 121, the master node 122, and the manager node 123 each having a container structure. This is the same as the in-memory cluster 120 described above, so a detailed description thereof will be omitted.

Figure 7:
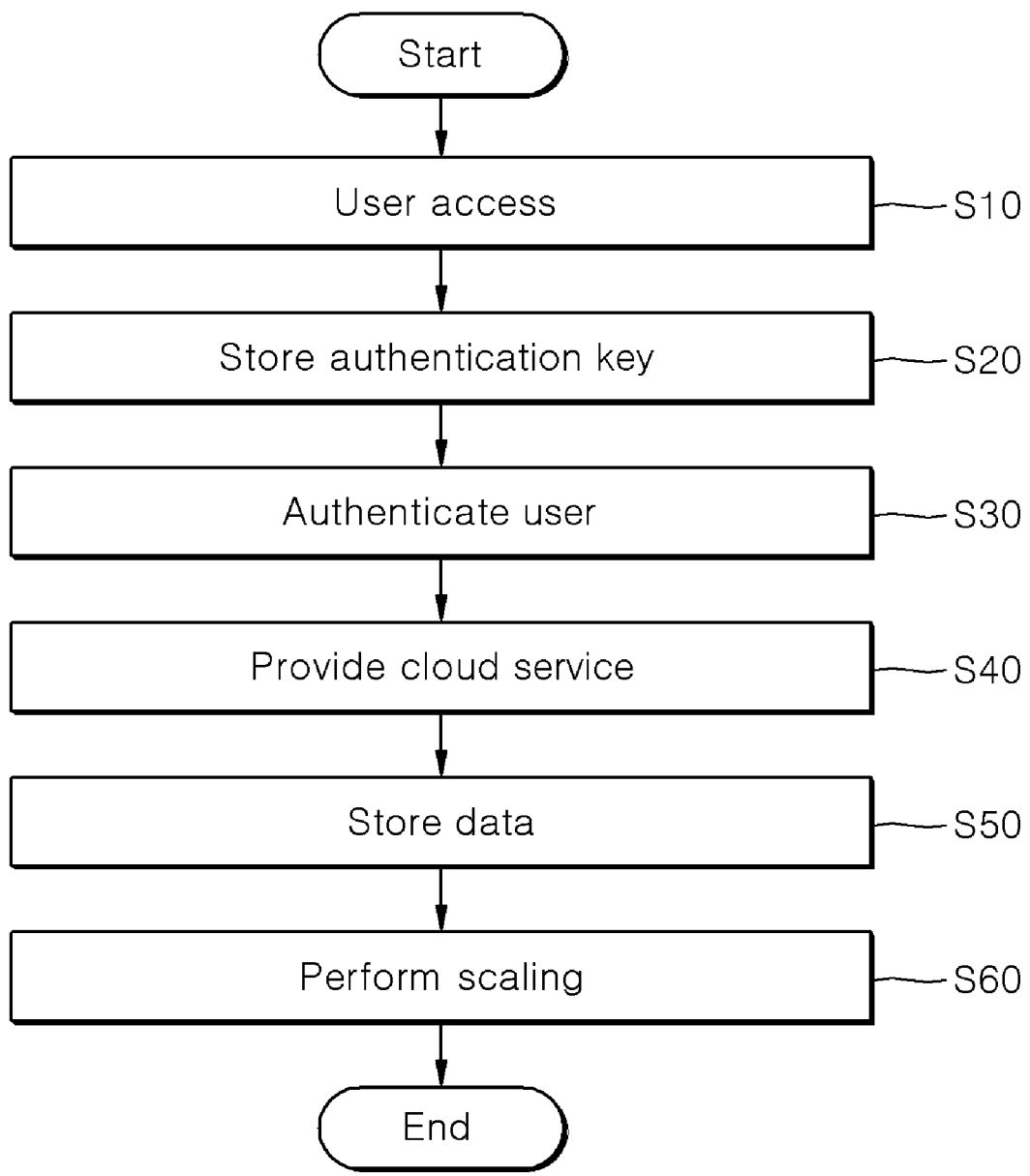
FIG. 7 is a diagram illustrating a container-based cloud service providing method according to an embodiment of the present disclosure.

FIG. 7 is a diagram illustrating a container-based cloud service providing method according to an embodiment of the present disclosure.

Hereinafter, the container-based cloud service providing method according to an embodiment of the present disclosure will be described with reference to FIG. 7 together with the above-described embodiments related to FIGS. 4 and 5.

Referring to FIG. 7, the container-based cloud service providing method according to an embodiment of the present disclosure may include a user access step S10, an authentication key storing step S20, a user authentication step S30, a cloud service providing step S40, a data storing step S50, and a scaling step S60.

At the user access step S10, the access server 110 and the user terminal 10 may be network-connected through a web socket.

At the authentication key storing step S20, an authentication key for each user terminal 10 that accesses the access server 110 may be generated, and the authentication key may be stored in the container-based in-memory cluster 120 having an area allocated in a cloud. This step S20 may be performed through the security module 131 having the container structure.

At the user authentication step S30, while the user terminal 10 uses the cloud service, the authentication of the user terminal 10 may be periodically performed using the authentication key stored in the in-memory cluster 120. This step S30 may be performed through the security module 131.

At the cloud service providing step S40, the cloud service may be provided to the authenticated user terminal 10, and event data generated upon providing the cloud service may be stored in the in-memory cluster 120. This step S40 may be performed by the service module 133 having the container structure.

At the data storing step S50, the event data stored in the in-memory cluster 120 may be periodically stored in the database 150. This step S50 may be performed through the data storage module 132 having the container structure.

At the scaling step S60, scaling of the security module 131 may be performed for load balancing of the security module 131. This step S60 may be performed by the manager module 140.

In addition, at this step S60, the number of security modules 131 may be adjusted in response to traffic by the user terminal 10.

Meanwhile, a step of adjusting the number of at least one of the data storage module 132 and the service module 133 in response to the traffic by the user terminal 10 may be additionally performed. This step may be performed by the manager module 140. Because the scaling method for the modules 131, 132, and 133 has been described above, a description thereof will be omitted here.

In addition, the in-memory cluster 120 according to an embodiment of the present disclosure may include the slave node 121, the master node 122, and the manager node 123 each having the container structure of FIG. 2B.

The slave node 121 may store the authentication key and event data in a cache. To this end, a cache capable of storing data may be allocated to each slave node 121.

The master node 122 monitors the state of the slave node 121. For example, the master node 122 may provide a notification to a manager terminal (not shown) when the utilization amount of resources secured through the slave node 121 reaches a predetermined threshold.

In response, the manager may transmit a slave addition request through the manager terminal, and the manager node 123 may additionally secure necessary resources by adding the slave node 121 in response to the request.

Those of ordinary skill in the art to which this disclosure pertains will understand that this disclosure may be embodied in other specific forms without changing the technical spirit or essential features thereof. Therefore, the embodiments described above should not be construed as limiting but rather as illustrative in every respect. The scope of the disclosure is defined by the following claims rather than the detailed description, and all modifications derived from the meaning and scope of the claims and equivalents thereto or modified forms should be interpreted as being included in the scope of the disclosure.

The invention claimed is:

1. A container-based cloud service providing system comprising:
  a processor and one or more memory devices communicatively coupled to the processor;
  an access server network-connected to a plurality of user terminals through a web socket;
  an in-memory cluster having an area allocated in a cloud, wherein the one or more memory devices stores instructions operable when executed by the processor to cause the in-memory cluster to perform storing an authentication key and event data based on a container;
  a server module, wherein the one or more memory devices stores instructions operable when executed by the processor to cause the server module to perform providing a cloud service to the user terminals;
  a manager module, wherein the one or more memory devices stores instructions operable when executed by the processor to cause the manager module to perform managing the server module; and
  a database,
  wherein the server module includes:
  a security module having a container structure, wherein the one or more memory devices stores instructions operable when executed by the processor to cause the security module to perform performing authentication of the user terminals;
  a data storage module having a container structure, wherein the one or more memory devices stores instructions operable when executed by the processor to cause the data storage module to perform periodically storing the event data stored in the in-memory cluster in the database; and
  a service module, wherein the one or more memory devices stores instructions operable when executed by the processor to cause the service module to perform providing the cloud service by using the event data,
  wherein the one or more memory devices stores instructions operable when executed by the processor to cause the security module to perform generating the authentication key for each user terminals, storing the authentication key in the in-memory cluster, and periodically authenticating the user terminals by using the authentication key stored in the in-memory cluster while the user terminals use the cloud service, and
  wherein the one or more memory devices stores instructions operable when executed by the processor to cause the manager module to perform scaling of the security module for load balancing of the security module, and
  wherein the in-memory cluster includes:
  a slave node having a container structure, wherein the one or more memory devices stores instructions operable when executed by the processor to cause the slave node to perform storing the authentication key and the event data in a cache;
a master node having a container structure, wherein the one or more memory devices stores instructions operable when executed by the processor to cause the master node to perform monitoring a state of the slave node; and
a manager node having a container structure, wherein the one or more memory devices stores instructions operable when executed by the processor to cause the manager node to perform storing information of the in-memory cluster.

2. The container-based cloud service providing system of claim 1, wherein the one or more memory devices stores instructions operable when executed by the processor to cause the master node to perform transmitting a notification to a manager terminal when a utilization amount of secured resources reaches a threshold, and the one or more memory devices stores instructions operable when executed by the processor to cause the manager node to perform generating the slave node in response to a request transmitted from the manager terminal.

3. The container-based cloud service providing system of claim 1, wherein the one or more memory devices stores instructions operable when executed by the processor to cause the manager module to perform adjusting the number of the security module in response to traffic by the user terminals.

4. The container-based cloud service providing system of claim 3, wherein the one or more memory devices stores instructions operable when executed by the processor to cause the manager module to perform adjusting the number of at least one of the data storage module and the service module in response to the traffic by the user terminals.

* * * * *